July 31, 1934.     C. G. SUITS     1,968,576
CONTROL APPARATUS FOR ALTERNATING CURRENT CIRCUITS
Filed Sept. 23, 1933
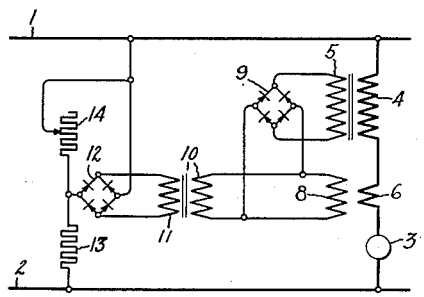
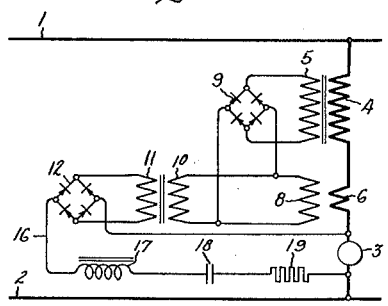
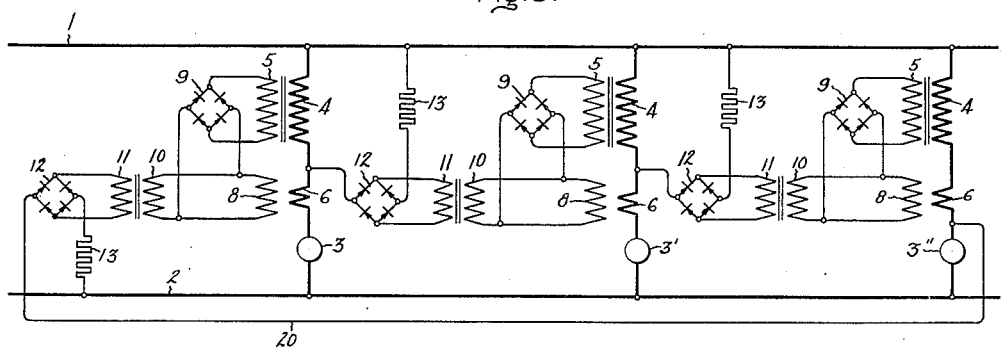
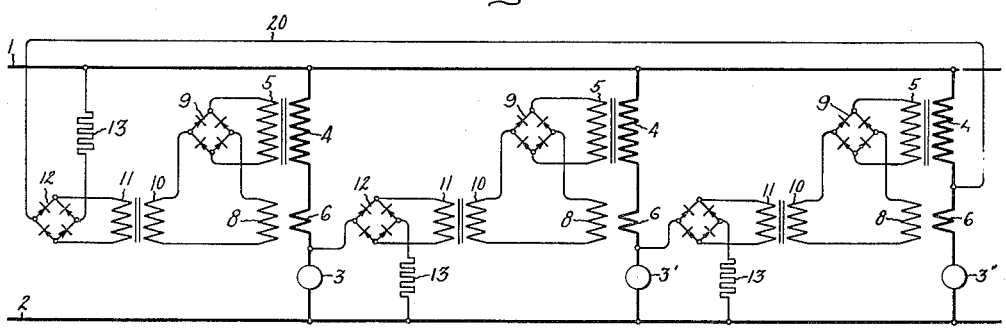
Inventor:
Chauncey G. Suits,
by Harry E. Dunham
His Attorney Patented July 31, 1934

1,968,576

UNITED STATES PATENT OFFICE 1,968,576

CONTROL APPARATUS FOR ALTERNATING CURRENT CIRCUITS

Chauncey G. Suits, Schenectady, N. Y., assignor to General Electric Company, a corporation of New York Application September 23, 1933, Serial No. 690,705

4 Claims. (Cl. 171—97)

My invention relates to apparatus which include saturable core reactors for controlling alternating current circuits. In certain forms of control apparatus of this character heretofore employed a rectifier has been used to provide direct current for the saturating winding of the reactor. When a rectifier is used which varies with temperature and time, such for example as a copper oxide rectifier, it has been necessary to ballast the rectifier such as by connecting a resistor in the A. C. circuit thereof so that changes in rectifier resistance due to those causes are subordinated to the total impedance of the rectifier circuit. For example, in a circuit having a reactor employed to control the current of a small electric sign, the voltage at the A. C. terminals of the rectifier may be 15 while the voltage at the terminals of the A. C. circuit including the rectifier and the ballast may be 115. It is the object of my invention to provide improved means for effecting the necessary ballast for the rectifier whereby the losses heretofore experienced may be avoided. My invention makes it possible to use the load in the controlled alternating current circuit for the rectifier ballast with the result that for a given load it becomes practical to use a reactor of a smaller power ratio and for a given power ratio to obtain a much greater percentage of ballast. In accordance with my invention I employ a current transformer in the controlled alternating current circuit the secondary of which supplies alternating current to the rectifier.

My invention will be better understood from the following description taken in connection with the accompanying drawing, and its scope will be pointed out in the appended claims.

Referring to the drawing, Fig. 1 is a circuit diagram illustrating one embodiment of my invention; Fig. 2 is a circuit diagram illustrating a modified form thereof; and Figs. 3 and 4 are circuit diagrams illustrating sequence operating systems also embodying my invention.

In Fig. 1 a source of constant potential alternating current supply is represented at 1 and 2, which for example may be a 60 cycle 110 volt source. Connected across this source of supply is the load 3, the saturable core reactor 4 having the saturating winding 5, and the primary winding of the current transformer 6 all arranged in series. The secondary winding 8 of the current transformer connects through the full wave rectifier 9 with the saturating winding 5 whereby the transformer supplies direct current thereto. Connected in shunt with the secondary winding 8 is a second saturable core reactor 10 having the saturating winding 11. Current is supplied to winding 11 from the source 1 and 2 through the full wave rectifier 12, a suitable ballast resistor 13 being included in the connection with the source. For varying the current supplied to rectifier 12 I have shown by way of example the rheostat 14 shunted around the rectifier.

The operation of the apparatus shown in Fig. 1 is as follows. Supposing that the rheostat 14 is set to include a maximum resistance, the current supplied to the saturating winding 11 will be a maximum. Reactor 10 therefore will be saturated whence it will offer a minimum impedance. The current then supplied by the secondary 8 to rectifier 9 will be a minimum, and the current supplied to the winding 5 also will be a minimum. As a result reactor 4 will be in a non-saturated condition whence the impedance offered by it to the load circuit will be a maximum. The current flow in the load circuit being a minimum, the load 3 if it be a lamp will either be extinguished or substantially invisible. To increase the load current and to cause the load, if it be a lamp, to become illuminated, the rheostat 14 is adjusted to a position which will include a minimum resistance. The current flow through rectifier 12 will now be a minimum and the saturation of reactor 10 will be a minimum. Hence the reactor will offer a maximum impedance. The current therefore supplied by the transformer to the saturating winding 5 of reactor 4 through rectifier 9 will be a maximum and reactor 4 being saturated, will offer a minimum impedance to the load circuit. The current in the load circuit therefore rises to a maximum.

By this arrangement it will be seen that a substantially constant current is supplied to rectifier 9 regardless of changes occurring in the rectifier due to temperature and time, and as a result of the above-described arrangement the load in the controlled alternating current circuit is used as rectifier ballast.

In the modified form illustrated by Fig. 2, the second rectifier is arranged to be supplied by pulsating alternating current obtained from the voltage sensitive non-linear resonant circuit 16. This circuit includes the self-saturating reactor 17, the capacitor 18, and the resistor 19, arranged in series with the rectifier 12 and connected across the load 3. The values of inductance, capacitance, and resistance of circuit 16 are so proportioned that when the current in the load circuit is a minimum, circuit 16 is in a non-resonant condition, hence the current supplied to saturating winding 11 is a minimum, and reactor 10 offers a maximum impedance. The current therefore supplied to rectifier 9 is a maximum and reactor 4 being thereby saturated offers a minimum impedance to the load circuit, whence the current in the load circuit rises to a maximum value. This maximum value produces a maximum potential difference across the load 3 which is sufficient to cause circuit 16 to become resonant. As a result of this resonance, however, reactor 10 becomes saturated and a minimum current is supplied to the saturating winding 5 through rectifier 9, whence reactor 4 becomes desaturated and its impedance rises to a maximum value thereby reducing the load current to a minimum again. In this manner the cycle of maximum and minimum load current repeats itself with regularity and at a frequency which is materially less than the frequency of the alternating current supply. By varying the constants of the various reactors and the capacitor, the frequency of pulsations in the load circuit may be varied within wide limits.

In the modification represented by Fig. 3 I have shown my invention applied to a series of branch load circuits connected to the same source of supply which circuits are adapted to operate in sequence. While it is to be understood that there may be any desired number of branch load circuits forming the series, for convenience I have shown but three such circuits, the loads in the three circuits being represented by 3, 3' and 3". The rectifiers 12 associated with the second and third branch circuits, namely those circuits having loads 3' and 3", each connect across the reactor 4 of the previous branch circuit, a suitable ballasting resistor 13 being included in the circuit. The current taken by each rectifier 12 therefore is responsive to the potential difference across the load reactor of the previous branch circuit. The rectifier 12 associated with the first branch circuit connects through resistor 13 and line 20 across the load 3" of the last branch circuit. This sequence operating circuit is somewhat similar to and is claimed broadly in my copending application Serial No. 582,801 filed December 23, 1931.

The operation of this form of my invention is as follows. Supposing reactor 4 of the first branch circuit is in a non-saturated condition whence the impedance offered by it is a maximum and the load current of that branch is a minimum. The current then supplied to rectifier 12 associated with the second branch circuit is a maximum, reactor 10 is saturated, the current supplied to rectifier 9 is a minimum, and reactor 4 of the second branch circuit is in a non-saturated condition. Since this reactor now offers a maximum impedance, the load current in the second branch circuit is a minimum. In the same manner the load current in the third branch circuit becomes a minimum. Since the current traversed load 3" is a minimum, the potential difference across the load is a minimum, and the current supplied to rectifier 12 of the first branch circuit is also a minimum. Hence reactor 10 of the first branch circuit is non-saturated and as a result a maximum current is supplied to rectifier 9 of the first branch circuit, which causes a saturation of reactor 4 of the first branch circuit. This saturation of reactor 4 reduces the impedance of the first branch circuit and current flowing in that branch rises to a maximum. In a similar manner current in each of the succeeding branch circuits successively rises to a maximum. The maximum current in the last branch circuit causes a maximum current to be supplied to the rectifier 12 of the first branch circuit which in turn causes the current in the first branch circuit to be reduced to a minimum thus completing the cycle of operation. The rate at which the current successively increases and decreases in the branch circuits forming the series depends principally upon the constants of the reactors employed therewith and may be varied within limits.

The modified form shown in Fig. 4 is similar to that shown by Fig. 3 except that in this case the saturable core reactor 10 is arranged in series with the secondary winding 8 and the rectifier 9. Because of this difference in arrangement the rectifier 12 of the first branch circuit is connected to be responsive to the potential difference across the reactor 4 of the last branch circuit rather than across the load of that branch as in Fig. 3. It is thought that the operation of the form shown in Fig. 4 will be so obvious in view of the description of the operation of the form shown in Fig. 3 that any detailed description of such operation will be unnecessary.

In the several circuit diagrams which illustrate my invention, I have shown the saturable core reactors in a purely diagrammatic manner. It will be understood, however, that as actually constructed they may take the form shown, for example, by Fig. 1 of my Patent No. 1,885,155. If preferred, however, the reactors instead of comprising a single core structure may comprise a plurality of separate transformers connected together as shown for example by Fig. 2 of the aforesaid patent.

I have chosen the particular embodiments described above as illustrative of my invention and it will be apparent that various other modifications may be made without departing from the spirit and scope of my invention which modifications I aim to cover by the appended claims.

What I claim as new and desire to secure by Letters Patent of the United States is:

1. A sequence operating system comprising a source of alternating current supply, a series of branch circuits connected therewith each including a load, a saturable core reactor having a saturating winding and a current transformer connected in series, means including a rectifier connecting the secondary of said transformer with said winding, a second saturable core reactor having a saturating winding arranged to shunt said secondary and means responsive to the voltage across the reactor in another branch circuit for supplying rectified current to the saturating winding of said second reactor.

2. A sequence operating system comprising a source of alternating current supply, a series of branch circuits connected therewith each including a load, a saturable core reactor having a saturating winding and a current transformer connected in series, means including a rectifier connecting the secondary of said transformer with said winding, a second saturable core reactor having a saturating winding arranged in series with said secondary and means responsive to the voltage across the load in another branch circuit for supplying rectified current to the saturating winding of said second reactor.

3. In combination, a source of supply of alternating current, a saturable core reactor provided with a saturating winding, a current transformer primary and a load device all connected together in a series circuit, a rectifier connected to be energized from the secondary of said current transformer and connected to supply rectified current to said saturating winding and control device comprising a variable impedance connected with the secondary of said current transformer and arranged to vary the current supplied thereby to the rectifier.

4. In combination, a source of supply of alternating current, a saturable core reactor provided with a saturating winding, a current transformer primary and a load device all connected together in a series circuit, a full wave rectifier having its input side connected across the secondary of said current transformer and having its output side connected to supply rectified current to said saturating winding and a variable impedance connected across said secondary to variably shunt the current supplied to the rectifier by said secondary.

CHAUNCEY G. SUITS.